United States Patent [19]
Ford

[11] Patent Number: 6,101,723
[45] Date of Patent: Aug. 15, 2000

[54] FOLDING KNIFE WITH ECCENTRIC PIVOT PIN

[75] Inventor: Vince Ford, Arvada, Colo.

[73] Assignee: Spyderco, Inc., Golden, Colo.

[21] Appl. No.: 09/126,347

[22] Filed: Jul. 30, 1998

Related U.S. Application Data

[60] Provisional application No. 60/057,177, Aug. 26, 1997.

[51] Int. Cl.[7] .................................................. F41C 27/18
[52] U.S. Cl. ................................. 30/157; 30/160; 30/161
[58] Field of Search .............................. 30/151, 155, 160, 30/161, 342; 403/408.1, 410; 411/337, 935.1

[56] References Cited

U.S. PATENT DOCUMENTS

| | | | |
|---|---|---|---|
| 2,630,114 | 3/1953 | Hart | 30/160 |
| 3,006,443 | 10/1961 | Siler | 30/160 |
| 3,263,329 | 8/1966 | Hennessy | 30/155 |
| 3,731,961 | 5/1973 | Becker | 403/408.1 |
| 3,942,394 | 3/1976 | Juranitch | 76/84 |
| 4,133,106 | 1/1979 | Addis | 30/160 |
| 4,170,061 | 10/1979 | Henry | 30/160 |
| 4,266,591 | 5/1981 | F'Geppert | 411/167 |
| 4,272,887 | 6/1981 | Poehlmann | 30/161 |
| 4,394,096 | 7/1983 | Stevens | 403/408.1 |
| 4,447,950 | 5/1984 | Mizelle | 30/155 |
| 4,901,439 | 2/1990 | Boyd, Jr. | 30/161 |
| 5,060,379 | 10/1991 | Neely | 30/161 |
| 5,502,895 | 4/1996 | Lemaire | 30/158 |
| 5,511,310 | 4/1996 | Sessions et al. | 30/161 |
| 5,537,750 | 7/1996 | Seber et al. | 30/161 |
| 5,546,662 | 8/1996 | Seber et al. | 30/161 |
| 5,615,484 | 4/1997 | Pittman | 30/161 |
| 5,661,908 | 9/1997 | Chen | 30/125 |
| 5,755,035 | 5/1998 | Weatherly | 30/161 |
| 5,794,346 | 8/1998 | Seber et al. | 30/161 |
| 5,799,400 | 9/1998 | Glesser | 30/298.4 |

FOREIGN PATENT DOCUMENTS

| | | |
|---|---|---|
| 33 24 637 | 2/1984 | Germany . |
| 2013111 | 8/1979 | United Kingdom . |
| 2208212 | 3/1989 | United Kingdom . |

*Primary Examiner*—M. Rachuba
*Attorney, Agent, or Firm*—Sheridan Ross P.C.

[57] ABSTRACT

An eccentric pivot pin with two distinct centers of axis is provided for use with a folding knife to reduce the time to assemble the various components of the folding knife and the alignment between the folding knife blade and a blade locking mechanism.

24 Claims, 4 Drawing Sheets

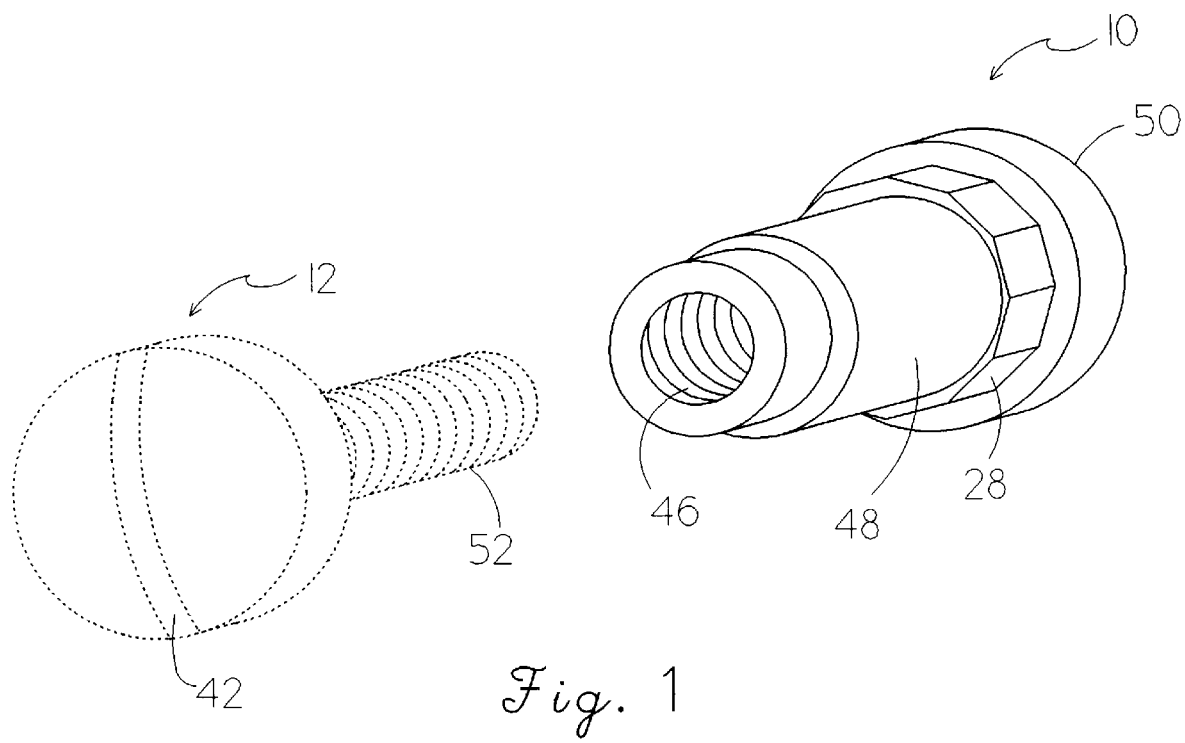
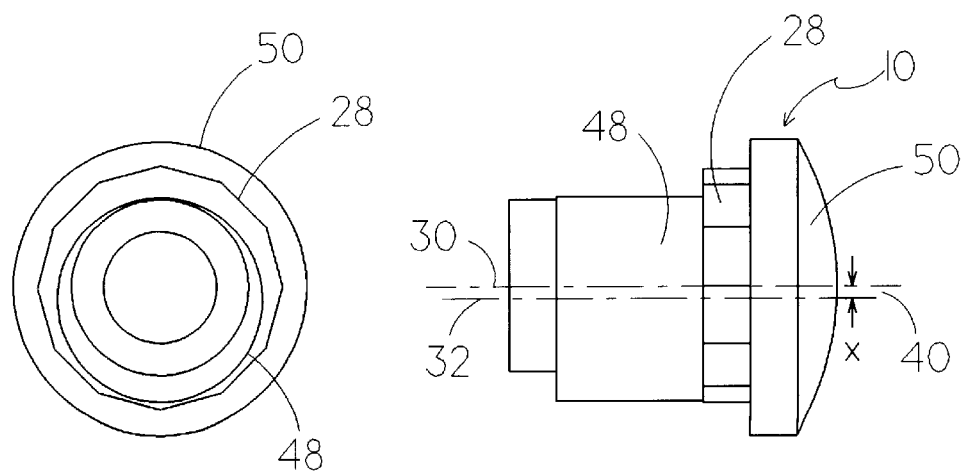
Fig. 1
Fig. 2
Fig. 3

FOLDING KNIFE WITH ECCENTRIC PIVOT PIN

RELATED APPLICATION

The present application claims priority of U.S. provisional patent application Ser. No. 60/057,177 which was filed on Aug. 26, 1997. The application is incorporated herein by reference in its entirety.

FIELD OF THE INVENTION

This invention relates to cutting instruments and more specifically folding knives which utilize a linerlock type of locking mechanism to keep the cutting blade in an extended, locked position.

BACKGROUND OF THE INVENTION

Folding knives are cutting instruments which generally have two positions. These include a closed, secure position with the cutting edge of the blade recessed within the handle, and an open position with the blade extended to expose the blade cutting edge. In the extended position the blade is generally "locked" in place to prevent the blade from inadvertently closing and potentially injuring the user of the blade.

The knife blade is generally locked in the extended position by either a latch mechanism located on the upper portion of the knife, i.e., near a user's thumb, or by the use of a leaf spring, or "linerlock". The linerlock is generally a rigid metallic plate which is interconnected to an interior surface of one of the scales of the handle and which has a biased metal stopping arm which extends into the recessed portion of the handle when the blade is extended open. An end portion of the linerlock stopping arm engages the rear end portion of the blade, thus preventing the blade from closing.

For safe and proper operation of a folding knife which utilizes a linerlock, the tolerance between the rear portion of the blade and the stopping arm portion of the linerlock is critical. If there is any significant gap between these two members, the blade will inadvertently move and slightly rotate even when the blade is in an extended, locked position. If the linerlock stopping arm is too long and there is no clearance between the rear end of the knife blade and the stopping arm, the linerlock will not properly engage the blade and the folding knife will not be capable of being properly locked in an extended open position.

To assure the proper tolerance between the linerlock and the rear end of the knife blade, a significant amount of time and expense is involved during the manufacturing of a folding knife which utilizes a linerlock. The majority of this time and expense is spent on the assembly line as the assembler attempts to properly align the knife blade rear end and the linerlock stopping arm in a position which assures a proper tolerance between the two components. This assembling procedure often requires the filing of the rear end of the blade, linerlock, or both with a steel file and the reassembly of the knife. Occasionally the knife must be disassembled numerous times before a proper fit is obtained, thus wasting valuable time and significantly adding to the cost of a folding knife which utilizes a linerlock locking mechanism.

SUMMARY OF THE INVENTION

It is thus an object of the present invention to provide components for a folding knife with a blade locking mechanism which decreases the assembly time of the knife while maintaining the critical tolerance between the rear end of the knife blade and the front end of the locking mechanism. Although the locking assembly typically is a "linerlock" type apparatus, any type of locking mechanism which requires a close tolerance with respect to the rear end of the knife blade is applicable to the present invention. Thus, any reference hereinafter to a "linerlock" should be interpreted to apply to all types of knife locking assemblies which engage a knife blade.

In one aspect of the present invention an "eccentric" pivot pin is provided upon which the blade rotates. Eccentric, as used herein, is defined as non-circular, or elliptical in shape. Thus, the cross-sectional shape of the pivot pin is not a traditional circular shape, but rather is elliptical or oblong. The eccentric pivot pin allows the knife blade to be carefully moved and positioned in a forward and rearward direction in relation to the linerlock during assembly without disassembling the other components of the knife. This eccentric pivot pin allows the assembler to properly align and orient the linerlock stopping arm and rear end of the knife blade without removing various components from the folding knife.

In one embodiment of the present invention the eccentric pivot pin has a first axis of rotation for a portion of the pivot pin which extends through the scales of the knife handle and a second axis of rotation for the portion of the pivot pin which extends through the aperture in the knife blade upon which the knife blade rotates. Thus, when the eccentric pivot pin is rotated during assembly of the knife blade to the knife handle, the knife blade moves in a forward or rearward direction relative to the stopping arm of the linerlock to quickly assure that there is a proper tolerance between the linerlock stopping arm and the rear end of the knife blade.

In another aspect of the present invention, the eccentric pivot pin has a plurality of integrally interconnected splines which are sized to matingly engage a plurality of locking "cogs" or indentations on the adjacent scale. Thus, when the pivot pin is tightened with the tightening screw, the splines engage the numerous locking cogs in the scale, thus preventing the eccentric pivot pin from rotating inadvertently.

BRIEF DESCRIPTION OF THE DRAWINGS

FIG. 1 is a front prospective view of the eccentric pivot pin and associated tightening screw;

FIG. 2 is a end view of the eccentric pivot pin;

FIG. 3 is a right elevation view of the eccentric pivot pin of FIG. 1;

DETAILED DESCRIPTION OF THE PREFERRED EMBODIMENT

Figure 4:
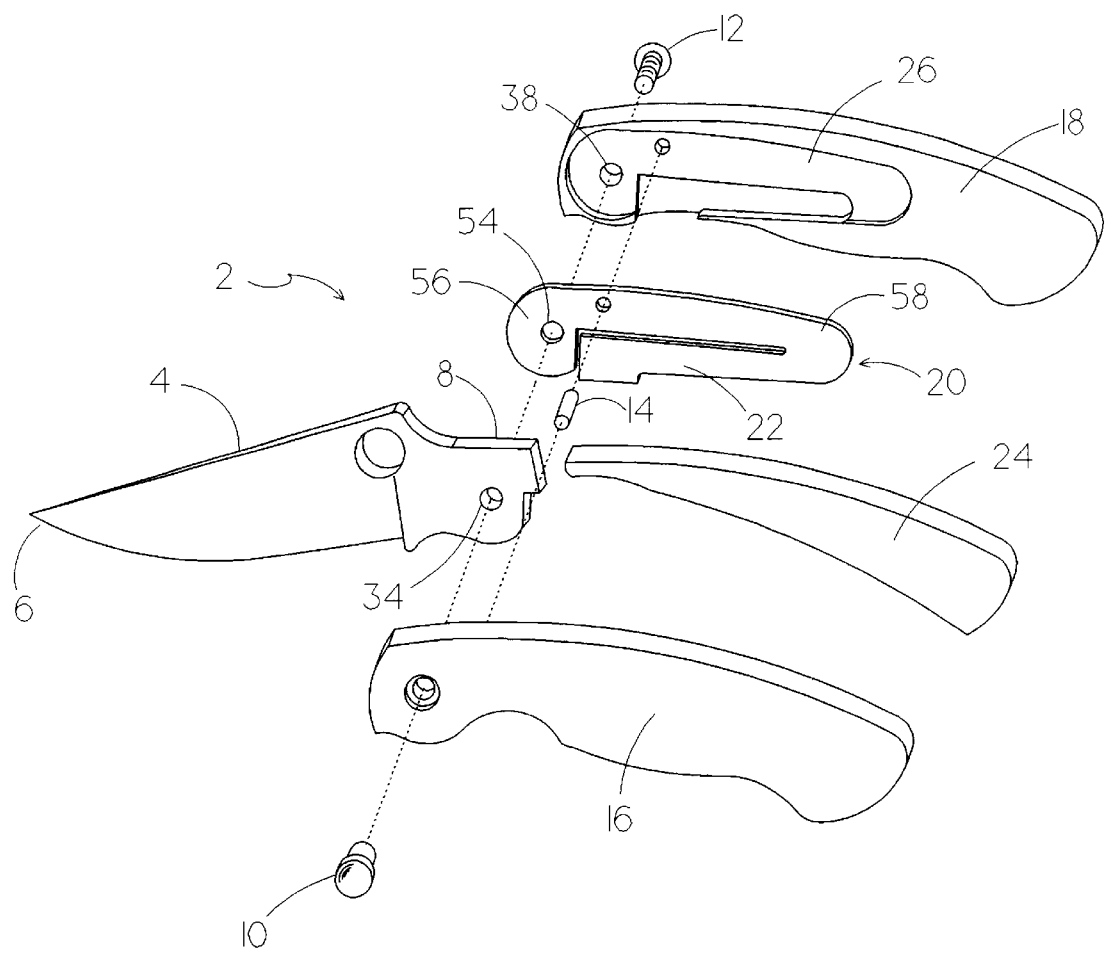
FIG. 4 is a respective exploded view of a folding knife with linerlock showing the various components therein.

Referring now to FIGS. 1–8, the present invention relates to a folding knife 2 which utilizes a locking assembly such as a linerlock locking mechanism to keep the blade in an extended open position. Referring now to FIG. 4, an exploded view of a typical folding knife 2 with a linerlock is shown. In general, the folding knife 2 comprises a blade 4 having a front end 6, a rear end 8, and an aperture 34 extending through the blade proximate to the rear end 8. The aperture 34 is sized to receive a pin or stud which permits the knife blade to rotate around the pin between a first extended position and a second closed position. In the second closed position, at least a portion of the folding knife blade cutting edge is recessed within a cavity of the knife handle.

A knife handle comprising a front scale 16 and a back scale 18 defines the cavity therebetween for receiving the knife blade 4. Each of the scales have a front end, a back end, and opposing apertures extending through the front end to receive the pivot pin upon which the folding knife rotates. The front scale 16 and back scale 18 in one embodiment are separated with a spacer 24 which is of sufficient dimension to define the cavity which receives the blade 4 when the folding knife blade 4 is in a closed position.

The folding knife 2 in one embodiment includes a substantially rigid linerlock 20 which is positioned generally within a portion of the cavity and which is interconnected to at least one of the scales. The linerlock 20 has a front end 56, a rear end 58 and a stopping arm 22, which is operably biased to engage the blade rear end 8 when the blade is in a first extended position. As appreciated by one skilled in the art, any type of locking assembly which requires a close tolerance between the rear end of a blade which rotates about a pin and the locking mechanism would benefit from the present invention.

The folding knife of the present invention includes an eccentric pivot pin 10 which extends through the scale apertures 38 located near the front end of the scales and the rear end of the blade 8. The eccentric pivot pin 10 has a first axis of rotation for the portion of the pivot pin which extends through the scales and a second axis of rotation for the portion of the pivot pin 10 which extends through the blade aperture 34. Thus, when the eccentric pivot pin 10 is rotated during assembly of the knife blade 4 and other knife components, the blade 4 moves forward or rearward to operably position the blade rear end 8 with the linerlock stopping arm 22.

Referring now to FIG. 1, the eccentric pivot pin 10 is shown in one embodiment with an accompanying tightening screw 12. As seen, the eccentric pivot pin 10 comprises a head 50, locking splines 28, a pivot pin rotation surface 48 for engaging the blade aperture 34 and pivot pin threads 46 for engaging the tightening screw threads 52. The pivot pin head 50 and/or tightening screw 12 may additionally have a rotation notch 42 or indentation which facilitates the insertion of a screwdriver, allen wrench or other similar device to rotate the pivot pin 10, and thus matingly tighten the pivot pin 10 and tightening screw 12.

Referring now to FIG. 3, a top plan view of the eccentric pivot pin 10 is shown. As illustrated, there is a centerline offset 40 between the pivot pin spline centerline 30 and the blade rotation pin centerline 32. This offset creates movement of the blade 4 in relation to the position of the linerlock 20 when the eccentric pivot pin 10 is rotated during the assembly of the folding knife. This movement of the blade substantially reduces the time required for assembling the folding knife and generally prevents the assembler from having to file components or otherwise disassemble the folding knife 2 during the assembly process.

In effect, the reduced folding knife 2 assembly time is reduced by the knife assembler moving the blade 4 substantially forward or rearward by rotating the eccentric pivot pin 10 until the blade 4 is in a properly aligned position with the linerlock stopping arm 20. Once proper alignment is obtained, the tightening screw 12 is tightened into the eccentric pivot pin 10, which draws the locking splines 28 into the scale to engage the scale locking cogs 36, thus preventing any additional rotational movement of the pivot pin 10 and thus movement of the blade 4.

Although the drawings show a preferred embodiment where the eccentric pivot pin assembly comprises both a pivot pin 10 and tightening screw 12, it is possible that only the eccentric pivot pin 10 is necessary for effective operation. Thus, as long as the eccentric pivot pin can be secured in a manner which prevents rotation after proper alignment during assembly, the apparatus used for securement to the knife handle is secondary. For example, rather than utilize a tightening screw 12 to secure the eccentric pivot pin 10 to the knife handle, various spline engagement mechanisms such as shown on the pivot pin 10 at number 28 or thread configurations could be interconnected at the end of the pivot pin 10 opposite the head 50. The splines could engage an internal cog and be held in place permanently with certain adhesives or epoxies after the blade is properly aligned to the locking mechanism. Thus, as appreciated by one in the art, there are numerous ways to interconnect the eccentric pivot pin 10 to the knife handle after rotating the eccentric pivot pin 10 and aligning the knife blade rear 8 end with the knife locking mechanism.

Figure 5:
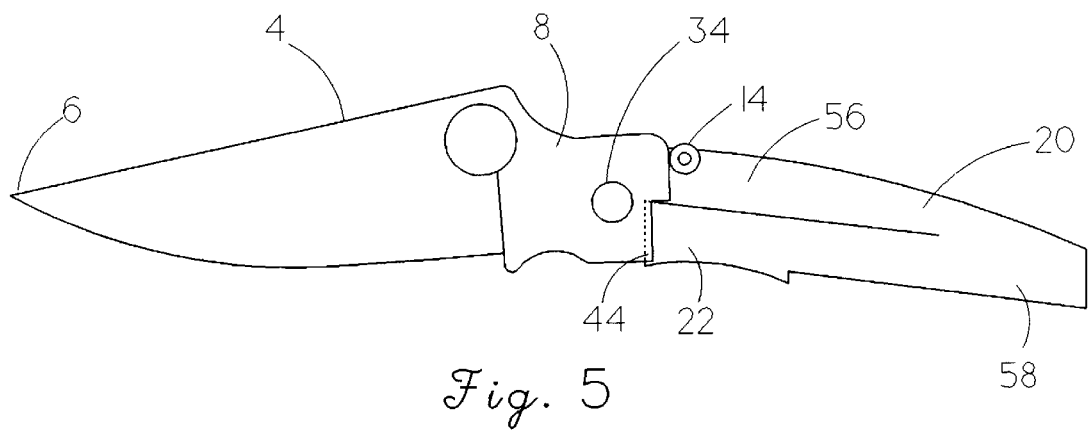
FIG. 5 is a front elevation view of the folding knife with linerlock of FIG. 4 with the front scale removed for clarity.
Figure 6:
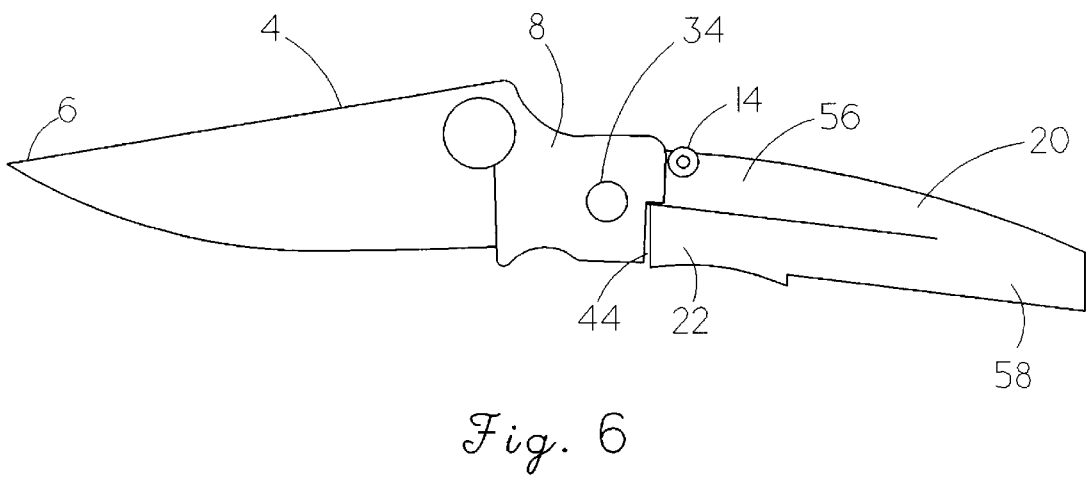
FIG. 6 is the folding knife with linerlock of FIG. 5 showing an offset between the linerlock stopping arm and rear end of the blade.

Referring now to FIGS. 5 and 6, FIG. 5 is a front elevation view of a folding knife 2 with linerlock with the front scale 16 removed for clarity purposes. As seen in this drawing, the orientation of the blade back end 8 and the linerlock stopping arm 22 is improper. That is, the blade back end 8 has extended over the linerlock stopping arm 22, thus preventing secure engagement and allowing the blade to be rotated since the blade is not abutted with the front end of the linerlock stopping arm 22. In this example, it is necessary to move the blade 4 forward with respect to the linerlock stopping arm 20 until there is proper tolerance between the blade rear end 8 and the linerlock stopping arm 22.

Referring now to FIG. 6, in this example there is an unacceptable blade/linerlock offset 44 between the blade rear end 8 and the linerlock stopping arm 22, which prevents the blade rear end 8 and linerlock stopping arm 22 to be properly abutted against one another for locking purposes. In this configuration, the blade 4 and linerlock stopping arm 22 have an improper tolerance and the blade 4 will move in an upward and downward direction, thus placing extensive stress and wear on the linerlock 20 and making the linerlock 20 susceptible to failure. Thus, in both of the examples shown in FIG. 5 and FIG. 6, the blade back end 8 is improperly aligned with the linerlock stopping arm 22, thus creating a situation where an assembler would be required to disassemble the knife and either file or reposition the various knife components (i.e., blade rear end and linerlock stopping arm) to obtain a proper tolerance. The failure by the knife assembler to do so may create a folding knife 2 which would not properly lock or which would eventually fail over time.

Figure 7:
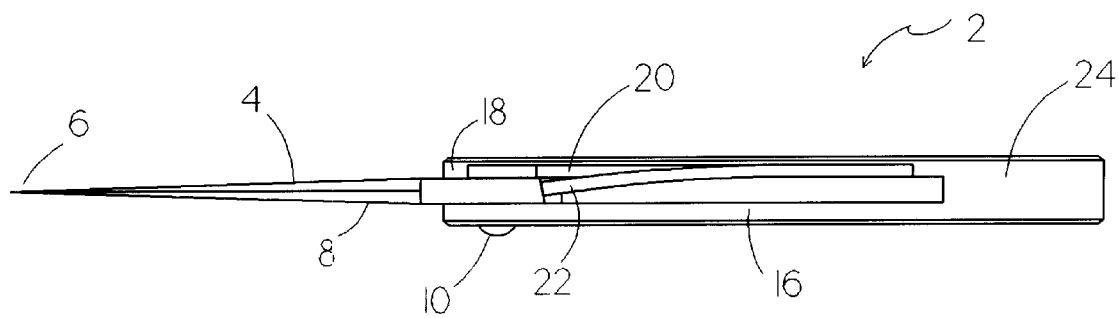
FIG. 7 is a top plan view of a folding knife with linerlock showing the blade in an extended position with the linerlock stopping arm engaged with the rear end of the knife blade.

Referring now to FIG. 7, a top plan view of a folding knife 2 with linerlock 20 locking mechanism is shown. As identified in this illustration, the linerlock stopping arm 22 is properly engaged with the blade back end 8. Thus, there is proper tolerance between the blade back end 8 and the linerlock stopping arm 22, thus substantially eliminating any excessive movement in the blade 4 and/or preventing the linerlock stopping arm 2 from not engaging the blade 4 which may allow inadvertent closure. Additionally, by rotating the eccentric pivot pin 10 during assembly, the knife blade 4 is encouraged to move forward and/or backward, as indicated by the arrow, until proper alignment is obtained between the blade rear end 8 and the linerlock stopping arm 22.

Figure 8:
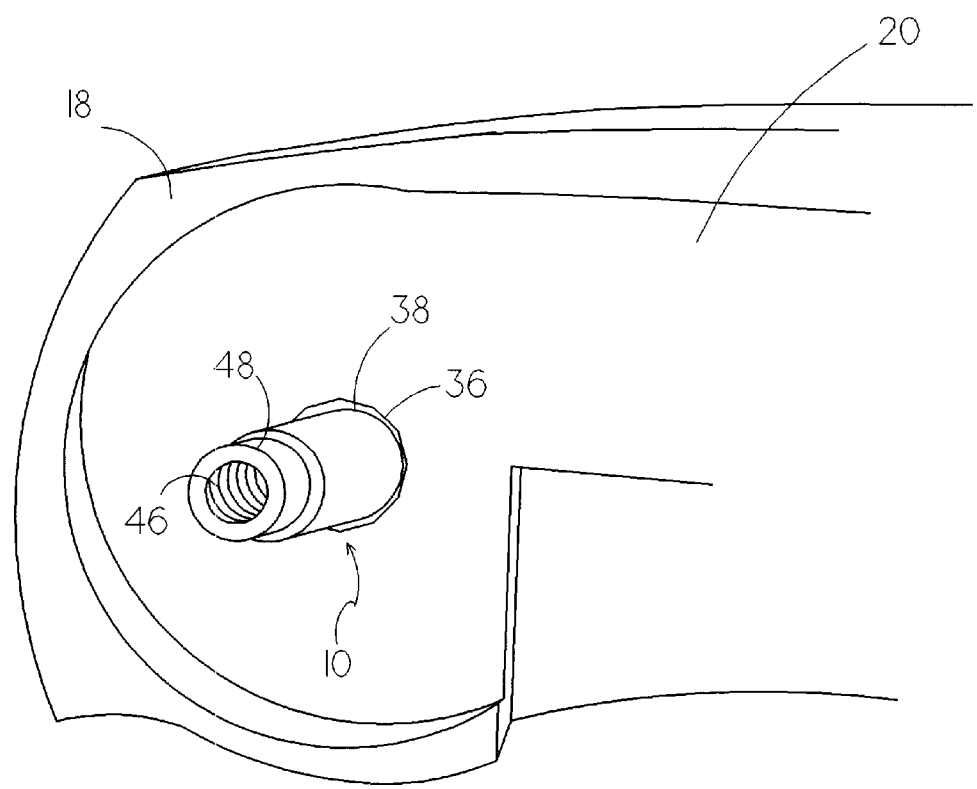
FIG. 8 is a front prospective view of the eccentric pivot pin extending through a back scale portion of a folding knife with linerlock.

Referring now to FIG. 8, a front elevation view of the back scale 18 is shown with a linerlock 20 interconnected to the back scale 18 and front scale 16 and knife blade 4 removed for illustration purposes. The eccentric pivot pin 10 is shown extending through the back scale 18 and the scale aperture 38. From this illustration, the scale locking cogs 36 may be seen which operably mate with the locking splines 28 of the eccentric pivot pin 10. Thus, during assembly and after the eccentric pivot pin 10 is rotated to properly position the blade rear end 8 with the linerlock stopping arm 22, the eccentric pivot pin 10 can be pushed into the scale until the scale locking cogs 36 properly align and mate with the eccentric pivot pin locking splines 28.

The locking mechanism described above substantially prevents the rotation of the eccentric pivot pin 50 and thus maintains the blade 4 in the proper position of alignment with the linerlock stopping arm 22. Once assembly is complete, the blade rotates substantially on the pivot pin rotation surface 48 while the eccentric pivot pin threads 46 are mated with the opposing threads of the tightening screw 12. Thus, when the eccentric pivot pin 10 or tightening screw 12 is rotated with a screwdriver or other similar object, the eccentric pivot pin 10 is drawn towards the tightening screw 12 until there is tight fit. As the locking splines 28 engage the scale locking cogs 36, the tightening screw 12 and eccentric pivot pin 10 are immobilized and the knife blade is properly aligned with the linerlock stopping arm 22.

Thus, during assembly, the eccentric pivot pin 10, in combination with the tightening screw 12, can be used by an assembler to substantially reduce the amount of time involved to assemble a folding knife 2 with linerlock 20. Accordingly, in one aspect of the present invention, a method is provided for assembling a folding knife which utilizes a linerlock locking mechanism. The method generally comprises the steps of:

(a) interconnecting a blade locking mechanism to an interior surface of at least one scale member of a folding knife handle;

(b) aligning an aperture extending through a back end of a blade with apertures extending through said front scale and said back scale;

(c) inserting an eccentric pivot pin through said apertures in said front and back scales and said knife blade;

(d) rotating said eccentric pivot pin to position said rear end of said blade with a stopping arm of the blade locking mechanism when the blade is in a first extended position; and (e) securing said pivot pin to said scales (by means of a tightening screw or other device) to substantially prevent the blade from inadvertently moving.

Additionally, the method of assembling may include a securing step which comprises positioning a plurality of locking splines 28 on the eccentric pivot pin 10 to opposing scale locking cogs 36 positioned proximate to said apertures in the scales, wherein the eccentric pivot pin 10 is substantially prevented from rotation after tightening the eccentric pivot pin 10 to a tightening screw 12.

In another aspect of the present invention, the eccentric pivot pin 10 is comprised of a durable metallic material, such as stainless steel. Although any type of rigid material may be used, such as plastic, fiberglass, or other materials, it is anticipated that durable metals are the best materials used for the present invention.

Referring again to the eccentric pivot pin 10 shown in FIG. 1, in one embodiment of the present invention the eccentric pivot pin 10 comprises a head portion 50 which has a greater diameter than the aperture in the front scale 16 or the back scale 18, thus preventing the eccentric pivot pin 10 from extending through the aperture in either the front scale 16 or the back scale 16.

With regard to the centerline offset 40 of the eccentric pivot pin 10, (shown in FIG. 3), it is preferred that the centerline offset 40 between the eccentric pivot pin spline centerline 30 and the blade rotation pin centerline 32 be between about 0.002 inches and 0.008 inches. More preferably, the offset is anticipated to be about 0.006 inches. This offset allows the assembler of a folding knife 2 to easily rotate the eccentric pivot pin 10 to move the knife blade 4 to the optimal position opposing the linerlock locking arm 22 prior to tightening the eccentric pivot pin 10 to the scales. This method of assembly utilizing the eccentric pivot pin 10 allows the assembler of the folding knife to quickly assemble the knife without repeatedly disconnecting the various components.

For clarity purposes, the following folding knife components and corresponding numbering as shown in the drawings are provided herein:

| Component No. | Component |
|---|---|
| 2 | Folding Knife |
| 4 | Blade |
| 6 | Blade Front End |
| 8 | Blade Rear End |
| 10 | Eccentric Pivot Pin |
| 12 | Tightening Screw |
| 14 | Stop Pin |
| 16 | Front Scale |
| 18 | Back Scale |
| 20 | Linerlock |
| 22 | Linerlock Stopping Arm |
| 24 | Spacer |
| 26 | Scale Linerlock Indentation |
| 28 | Locking Splines |
| 30 | Eccentric Pivot Pin Spline Centerline |
| 32 | Blade Rotation Pin Centerline |
| 34 | Blade Aperture |
| 36 | Scale Locking Cogs |
| 38 | Scale Aperture |
| 40 | Centerline Offset |
| 42 | Pivot Pin Rotation Notch |
| 44 | Blade/Linerlock Offset |
| 46 | Pivot Pin Threads |
| 48 | Pivot Pin Rotation Surface |
| 50 | Eccentric Pivot Pin Head |
| 52 | Tightening Screw Threads |
| 54 | Linerlock Aperture |
| 56 | Linerlock Front End |
| 58 | Linerlock Rear End |
| 60 | Eccentric Pivot Pin Head Outer End |
| 62 | Eccentric Pivot Pin Head Inner End |
| 64 | Pivot Pin Spline |
| 66 | Pivot Pin Spline First End |
| 68 | Pivot Pin Spline Second End |

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A folding knife, comprising:
   (a) a blade comprising a front end, a rear end, and an aperture extending through said blade proximate to said rear end;
   (b) a handle comprising two opposing scales which define a cavity therebetween for receiving at least a portion of said blade, said scales having a front end and a back end, said front ends having an aperture substantially opposing said blade aperture;
   (c) a linerlock positioned substantially between said opposing scales, said linerlock comprising a stopping arm operably biased to engage said rear end of said blade to substantially prevent said blade from rotating to a second closed position when said blade is in a first extended position; and
   (d) a pivot pin extending through said apertures in said scales and said blade, said pivot pin having a first axis of rotation for a portion of said pivot pin which extends through said aperture in said scales and a second axis of rotation for said portion of said pivot pin which extends through said aperture in said blade, wherein when said pivot pin is rotated, said blade travels in relation to said linerlock stopping arm to selectively position said rear end of said blade with said stopping arm of said linerlock.

2. The folding knife of claim 1, wherein said eccentric pivot pin comprises a head portion which has a greater diameter than said aperture in said scales.

3. The folding knife of claim 2, wherein said pivot pin has at least one spline proximate to said head portion for operably engaging a cog integrally interconnected to one of said scales to substantially prevent rotation of said pivot pin when said spline is engaged to said cog.

4. The folding knife of claim 1, wherein said pivot pin further comprises a threaded portion on the opposite end of said head portion, said threaded portion sized to operably receive a tightening screw, wherein said pivot pin and said tightening screw can be drawn together to hold said folding knife blade and said opposing scales together.

5. The folding knife of claim 4, wherein said head portion of said pivot pin or a head portion of said tightening screw further comprises a recessed portion for receiving a screwdriver or alien wrench to rotate said pivot pin.

6. The folding knife of claim 1, wherein said pivot pin is comprised of a metallic material.

7. The folding knife of claim 1, wherein said first axis of rotation and said second axis of rotation are offset between about 0.002 inches and 0.008 inches.

8. The folding knife of claim 1, wherein said first axis of rotation and said second axis of rotation are offset sufficiently to permit said blade to travel a distance in a direction substantially coextensive with said folding knife handle of between about 0.002 inches and 0.01 inches.

9. The folding knife of claim 1, wherein said linerlock is interconnected to an interior surface of at least one of said scales.

10. The folding knife of claim 1, wherein said knife blade further comprises a thumb depression positioned proximate to an upper edge of said knife blade, wherein said knife blade can be opened with one hand by a user applying force to said thumb depression in a direction toward said upper edge of said knife blade.

11. The folding knife of claim 1, wherein said knife blade further comprises a thumb stud positioned proximate to an upper edge of said knife blade, wherein said knife blade can be opened with one hand by a user applying force to said thumb stud in a direction toward said upper edge of said knife blade.

12. The folding knife of claim 1, wherein said folding knife further comprises a clip interconnected to at least one of said opposing scales for removably attaching said folding knife to an article of clothing.

13. A pivot pin assembly adapted for use in combination with a folding knife having a blade, a handle and a locking mechanism interconnected to said handle, comprising:
   (a) a substantially concentric first pivot pin having a first end, a second end, a first diameter and a first center of axis which is adapted for operable engagement with an aperture extending through said knife blade;
   (b) a second substantially eccentric pivot pin having a first end and a threaded second end, said first end integrally interconnected to said second end of said first pivot pin, said second pivot pin having a second diameter distinct from said first diameter and a second center of axis which is distinct from said first center of axis, said second pivot pin adapted for operably engaging an aperture extending through said knife handle; and
   (d) a tightening pin having threads for operable engagement with said second end of said first pivot pin, wherein said first and said second pivot pins and said tightening pins can be drawn together.

14. The eccentric pivot pin of claim 13, wherein said first pin further comprises a head portion of said first pivot pin which has a diameter greater than the diameter of said first pivot pin.

15. The eccentric pivot pin of claim 13, wherein said first pin has a plurality of splines interconnected thereto which are operably adapted to engage a plurality of cogs which are positioned proximate to said aperture extending through said knife handle.

16. The eccentric pivot pin of claim 13, wherein said first center of axis and said second center of axis are offset between about 0.002 inches and 0.008 inches.

17. The eccentric pivot pin assembly of claim 13, wherein said head portion has a diameter greater than said aperture extending through said knife handle.

18. The eccentric pivot pin assembly of claim 13, wherein said eccentric pivot pin assembly is comprised of a metallic material.

19. A method for assembling a folding knife with a locking mechanism and an eccentric pivot pin upon which a blade of said folding knife rotates, comprising the steps of:
   (a) positioning a blade locking mechanism within a cavity defined by a folding knife handle;
   (b) aligning an aperture extending through a rear end of a knife blade with an aperture of said handle;
   (c) inserting an eccentric pivot pin through said apertures in said folding knife handle and said aperture in said rear end of said knife blade;
   (d) rotating said pivot pin to align a rear end of said folding knife blade with a front end of said blade locking mechanism when said blade is in a first extended position; and
   (e) securing said pivot pin to said folding knife handle to substantially prevent said rear end of said knife blade from moving in relation to said front of said blade locking mechanism during use of said folding knife.

20. The method of claim 19, wherein said securing step comprises positioning a plurality of splines on said pivot pin to one or more opposing cogs in said folding knife handle, wherein said pivot pin is substantially prevented from rotation.

21. The method of claim 19, further comprising the step of interconnecting said blade locking mechanism to at least one of said scales.

22. The method of claim 19, further comprising the step of interconnecting said eccentric pivot pin with a tightening screw wherein said eccentric pivot pin and said tightening screw are matingly engaged.

23. The method of claim 19, wherein said blade locking mechanism comprises a linerlock.

24. A pivot pin assembly adapted for interconnecting a folding knife blade to a folding knife handle, said folding knife having a first extended position of use wherein said knife blade is substantially coextensive with said knife handle and a second position of use wherein at least a portion of said folding knife blade is received within a cavity defined by said knife handle, said pivot pin comprising:

a head portion;

a first substantially concentric pin interconnected on a first end to said head portion and having a first diameter and a first center of axis, said first concentric pin adapted for opposing an aperture in said knife blade;.

a second substantially eccentric pin interconnected on a first end to said first concentric pin and having a second diameter and a second center of axis which is distinct from said first diameter and said first center of axis, said second concentric pin adapted for opposing an aperture in said knife handle and having a threaded second end; and a tightening pin having a second head portion with a diameter greater than said second substantially eccentric pin and a pin portion for matingly interconnecting said tightening pin to said second substantially eccentric pin second end, wherein when said pivot pin assembly is interconnected to said knife and said first concentric pin is rotated, said knife blade moves in a direction coextensive with said longitudinal axis of said knife handle to align said knife blade with a locking mechanism interconnected to said folding knife during assembly of said folding knife.

* * * * *